United States Patent
Isobe et al.

(10) Patent No.: US 12,269,100 B2
(45) Date of Patent: *Apr. 8, 2025

(54) INSERT AND CUTTING TOOL

(71) Applicant: KYOCERA CORPORATION, Kyoto (JP)

(72) Inventors: Futoshi Isobe, Satsumasendai (JP); Satoshi Mori, Satsumasendai (JP); Azusa Hagihara, Satsumasendai (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/258,326

(22) PCT Filed: Dec. 7, 2021

(86) PCT No.: PCT/JP2021/044996
§ 371 (c)(1),
(2) Date: Jun. 20, 2023

(87) PCT Pub. No.: WO2022/138146
PCT Pub. Date: Jun. 30, 2022

(65) Prior Publication Data
US 2024/0017331 A1    Jan. 18, 2024

(30) Foreign Application Priority Data
Dec. 25, 2020 (JP) .................... 2020-218019

(51) Int. Cl.
*B23B 27/20* (2006.01)
*C04B 35/5831* (2006.01)

(52) U.S. Cl.
CPC .......... *B23B 27/20* (2013.01); *C04B 35/5831* (2013.01); *B23B 2226/125* (2013.01)

(58) Field of Classification Search
None
See application file for complete search history.

(56) References Cited

U.S. PATENT DOCUMENTS 5,618,509 A * 4/1997 Shioi ................... C04B 35/5831
423/290
6,071,841 A * 6/2000 Sumiya ............... C01B 21/0645
501/96.4

(Continued)

FOREIGN PATENT DOCUMENTS

| JP | 5929655 B2 | 6/2016 |
| JP | 7142165 B2 | 9/2022 |
| WO | 2019244894 A1 | 12/2019 |

OTHER PUBLICATIONS

Fukunaga, O; "The equilibrium phase boundary between hexagonal and cubic boron nitride", 1999, Diamond and Related Materials, vol. 9, pp. 7-12 (Year: 1999).*

*Primary Examiner* — Seth Dumbris
(74) *Attorney, Agent, or Firm* — HAUPTMAN HAM, LLP (57) ABSTRACT

A transmission X-ray diffraction on a cross section of a boron nitride sintered body perpendicular to a first surface provides X-ray intensities at a top of a 111 diffraction peak of cubic boron nitride and X-ray intensities at a top of a 002 diffraction peak of compressed boron nitride, in a direction perpendicular to the first surface and a direction parallel to the first surface. A compressed boron nitride content value obtained from these X-ray intensities is greater than 0.002 and smaller than 0.01. A cubic orientation value is greater than 0.5, and a compressed boron nitride orientation value is greater than the cubic orientation value. An insert has a coating layer on at least a part of a surface of the boron nitride sintered body.

11 Claims, 3 Drawing Sheets (56) References Cited

U.S. PATENT DOCUMENTS

| | | | |
|---|---|---|---|
| 2003/0170161 A1* | 9/2003 | Iizuka | C04B 35/583 423/290 |
| 2009/0130434 A1* | 5/2009 | Zhu | C04B 35/58014 407/119 |
| 2020/0247673 A1 | 8/2020 | Hirano et al. | |
| 2022/0259109 A1* | 8/2022 | Isobe | C04B 35/645 |

* cited by examiner

INSERT AND CUTTING TOOL

CROSS-REFERENCE TO RELATED APPLICATION(S)

This application is a national stage application of International Application No. PCT/JP2021/044996, filed on Dec. 7, 2021, which designates the United States, and which is based upon and claims the benefit of priority to Japanese Patent Application No. 2020-218019, filed on Dec. 25, 2020.

TECHNICAL FIELD

The present disclosure relates to an insert and a cutting tool.

BACKGROUND OF INVENTION

A boron nitride sintered body has high hardness. The boron nitride sintered body is applied to, for example, inserts for crushing members and tools by taking advantage of the characteristics thereof.

Patent Document 1 describes a boron nitride sintered body containing cubic boron nitride. Patent Document 1 also describes a cubic boron nitride composite polycrystalline substance containing Wurtzite-type boron nitride and having an orientation plane in which a ratio $I_{(220)}/I_{(111)}$ of an X-ray diffraction intensity $I_{(220)}$ of a (220) plane of cubic boron nitride with respect to an X-ray diffraction intensity $I_{(111)}$ of a (111) plane of cubic boron nitride is less than 0.1. In other words, in the orientation plane of the cubic boron nitride composite polycrystalline substance, the $I_{(111)}$ is 10 times or more as large as the $I_{(220)}$. That is, it can be said that the (111) plane is strongly oriented in the orientation plane. The cubic boron nitride composite polycrystalline substance is obtained by using oriented pBN as a raw material. It is stated that when including hexagonal boron nitride as a comparative example, the amount of wear is large and performance as a cutting tool is poor even if the (111) plane is strongly oriented in the orientation plane of cubic boron nitride.

CITATION LIST

Patent Literature

Patent Document 1: JP 5929655B

SUMMARY

An insert according to an aspect of the present disclosure includes a boron nitride sintered body having a first surface, a second surface, and a cutting edge located on at least a part of a ridge part of the first surface and the second surface. The boron nitride sintered body contains cubic boron nitride and compressed boron nitride. In a transmission X-ray diffraction of a cross section of the boron nitride sintered body perpendicular to the first surface, an X-ray intensity at a top of a 111 diffraction peak of the cubic boron nitride is denoted as IcBN(111)v, and an X-ray intensity at a top of a 002 diffraction peak of the compressed boron nitride is denoted as IhBN(002)v, in a direction perpendicular to the first surface, and an X-ray intensity at a top of a 111 diffraction peak of the cubic boron nitride is denoted as IcBN(111)h, and an X-ray intensity at a top of a 002 diffraction peak of the compressed boron nitride is denoted as IhBN(002)h, in a direction parallel to the first surface. A compressed boron nitride content value indicated by (IhBN(002)v+IhBN(002)h)/(IcBN(111)v+IcBN(111)h) is larger than 0.002 and smaller than 0.01. A cubic orientation value indicated by IcBN(111)v/(IcBN(111)v+IcBN(111)h) is larger than 0.5. A compressed boron nitride orientation value indicated by IhBN(002)v/(IhBNv(002)+IhBN(002)h) is larger than the cubic orientation value. The insert according to an aspect of the present disclosure includes a coating layer on at least a part of a surface of the boron nitride sintered body.

A cutting tool according to an aspect of the present disclosure includes a holder having a length ranging from a first end to a second end and including a pocket on the first end side, and the insert located in the pocket.

DESCRIPTION OF EMBODIMENTS

The following is a detailed description of an insert and a cutting tool according to the present disclosure (hereinafter referred to as "embodiments") with reference to the drawings. The present disclosure is not limited by the embodiments. In addition, embodiments can be appropriately combined so as not to contradict each other in terms of processing content. In the following embodiments, the same portions are denoted by the same reference signs, and overlapping explanations are omitted.

In the embodiments described below, expressions such as "constant", "orthogonal", "perpendicular", and "parallel" may be used, but these expressions do not need to be exactly "constant", "orthogonal", "perpendicular", and "parallel". In other words, each of the above-described expressions allows for deviations in, for example, manufacturing accuracy, positioning accuracy, and the like.

For convenience of description, the respective drawings that will be referred to in the following illustrate, in simplified form, only necessary main parts.

An insert made of a boron nitride sintered body is known. The insert of this type has room for further improvement in terms of increasing wear resistance.

Insert

Figure 1:
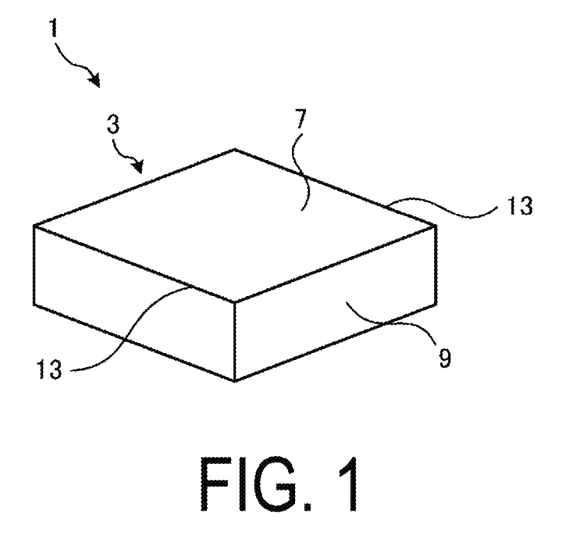
FIG. 1 is a perspective view illustrating an example of an insert according to a present disclosure.
Figure 2:
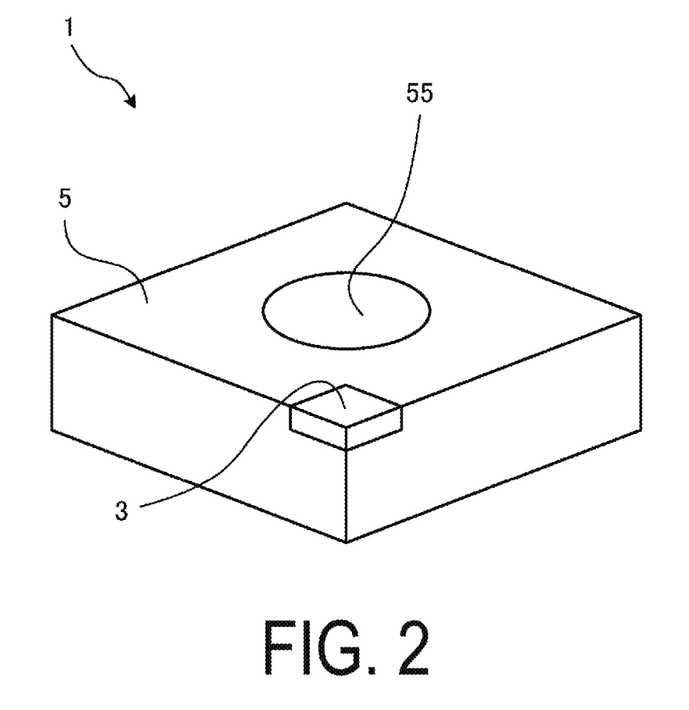
FIG. 2 is a perspective view illustrating another example of the insert according to the present disclosure.

FIG. 1 illustrates an example of an insert 1 according to the present disclosure. In the example illustrated in FIG. 1, the insert 1 is a boron nitride sintered body 3 having a polygonal shape. FIG. 2 illustrates another example of the insert 1 according to the present disclosure. FIG. 2 illustrates an example in which the boron nitride sintered body 3 is joined to a base body 5 made of, for example, cemented carbide. The base body 5 and the boron nitride sintered body 3 are joined to constitute the insert having the polygonal shape. This configuration makes it possible to reduce the proportion of the boron nitride sintered body 3, which is relatively expensive, in the insert 1. In the example illustrated in FIG. 2, the boron nitride sintered body 3 is located at one of a plurality of corner parts of the insert 1. The boron nitride sintered body 3 may also be located at two or more of the plurality of corner parts of the insert 1 without being limited thereto.

For example, a joining material (not illustrated) containing Ti or Ag may be located between the boron nitride sintered body 3 and the base body 5. The boron nitride sintered body 3 and the base body 5 can be integrated with the joining material interposed therebetween by using a conventionally known joining method.

The boron nitride sintered body 3 has a first surface 7 and a second surface 9. In the examples illustrated in FIGS. 1 and 2, the first surface 7 is an upper surface of the insert 1 and the second surface is a lateral surface of the insert 1. In addition, in the examples illustrated in FIGS. 1 and 2, the first surface 7 corresponds to a rake face, and the second surface 9 corresponds to a flank face. Hereinafter, the first surface 7 may be referred to as a rake face 7. The second surface 9 may be referred to as a flank face 9. The insert 1 includes a cutting edge 13 on at least a part of a ridge part of the first surface 7 and the second surface 9.

The boron nitride sintered body 3 in the insert 1 of the present disclosure contains cubic boron nitride and compressed boron nitride.

Among data obtained in a transmission X-ray diffraction of a cross section of the boron nitride sintered body 3 perpendicular to the first surface 7, the X-ray intensity of 111 diffraction of the cubic boron nitride in a direction perpendicular to the first surface 7 is denoted as IcBN(111)v. The X-ray intensity of 002 diffraction of the compressed boron nitride in the direction perpendicular to the first surface 7 is denoted as IhBN(002)v. Among data obtained in the transmission X-ray diffraction of the cross section of the boron nitride sintered body 3 perpendicular to the first surface 7, the X-ray intensity of 111 diffraction of the cubic boron nitride in a direction parallel to the first surface 7 is denoted as IcBN(111)h. An X-ray intensity of 002 diffraction of the compressed boron nitride in the direction parallel to the first surface 7 is denoted as IhBN(002)h.

Note that the respective planes in the cubic boron nitride described above are specified based on JCPDS card No. 01-075-6381. The respective planes in the compressed boron nitride are specified based on JCPDS card No. 18-251. The respective planes in the hexagonal boron nitride are specified based on JCPDS card No. 00-045-0893. The respective planes in Wurtzite-type boron nitride described later are specified based on JCPDS card No. 00-049-1327.

The transmission X-ray diffraction may be conducted using, for example, a curved IPX-ray diffractometer "RINT RAPID2" available from Rigaku Corporation.

(IhBN(002)v+IhBN(002)h)/(I(111)v+IcBN(111)h) obtained on the basis of each of the X-ray intensities is referred to as a compressed boron nitride content value. The compressed boron nitride content value is an index related to the amount of compressed boron nitride included in the boron nitride sintered body 3. The larger this value is, the larger the amount of compressed boron nitride included in the boron nitride sintered body 3 is. The compressed boron nitride content value is not the content itself.

In the boron nitride sintered body 3 in the insert 1 of the present disclosure, the compressed boron nitride content value is larger than 0.002 and smaller than 0.01. That is, the boron nitride sintered body 3 in the insert 1 of the present disclosure contains the compressed boron nitride to the extent that this condition is satisfied.

IcBN(111)v/(IcBN(111)v+IcBN(111)h) obtained on the basis of each of the X-ray intensities is referred to as a cubic orientation value. When the cubic orientation value is 0.5, a 111 plane of the cubic boron nitride is oriented in a random direction and is in a non-oriented state. The larger the cubic orientation value, the greater the degree that the 111 plane of the cubic boron nitride included in the boron nitride sintered body 3 is oriented parallel to the first surface 7.

In the boron nitride sintered body 3 in the insert 1 of the present disclosure, the cubic orientation value is larger than 0.5. In other words, the X-ray intensity at the top of a 111 diffraction peak of the cubic boron nitride in a perpendicular direction is greater than the X-ray intensity at the top of a 111 diffraction peak of the cubic boron nitride in a parallel direction. That is, it can also be said that the 111 plane of the cubic boron nitride is oriented along a normal direction of the first surface 7.

IhBN(002)v/(IhBN(002)v+IhBN(002)h) obtained on the basis of each of the X-ray intensities is referred to as a compressed boron nitride orientation value. When the compressed boron nitride orientation value is 0.5, the 002 plane of the compressed boron nitride is oriented in a random direction and is in a non-oriented state. The larger the compressed boron nitride orientation value, the greater the degree that the 002 plane of the compressed boron nitride included in the boron nitride sintered body 3 is oriented parallel to the first surface 7.

In the boron nitride sintered body 3 in the insert 1 of the present disclosure, the compressed boron nitride orientation value is larger than the cubic orientation value. That is, the 002 plane of the compressed boron nitride has a greater degree of being oriented parallel to the first surface 7 than the 111 plane of the cubic boron nitride.

The insert 1 of the present disclosure has excellent wear resistance by having the above configuration. This effect seems to be because the insert 1 of the present disclosure contains a small amount of compressed boron nitride, the 002 plane of the compressed boron nitride is oriented more in the first surface, and therefore, a workpiece welded to the first surface is peeled off together with the compressed boron nitride.

The boron nitride sintered body 3 in the insert 1 of the present disclosure may have a compressed boron nitride content value of 0.004 or larger and 0.008 or smaller. This configuration leads to high hardness of the insert 1.

The boron nitride sintered body 3 in the insert 1 of the present disclosure may have a cubic orientation value of 0.55 or larger. This configuration leads to high hardness of the rake face 7.

Additionally, the boron nitride sintered body 3 in the insert 1 of the present disclosure may have a compressed boron nitride orientation value of 0.8 or larger. This configuration leads to a long life of the insert 1.

The boron nitride sintered body 3 in the insert 1 of the present disclosure may contain Wurtzite-type boron nitride. The boron nitride sintered body 3 having this configuration has high hardness.

An average particle diameter of the cubic boron nitride in the insert 1 of the present disclosure may be 200 nm or smaller. This configuration leads to high strength of the insert 1. Note that the average particle diameter of the cubic boron nitride may be 100 nm or smaller.

The insert 1 of the present disclosure may include a hard coating layer (not illustrated) on a surface of the boron nitride sintered body 3.

Coating Layer

The insert 1 of the present disclosure may include a coating layer. The coating layer is coated on the boron nitride sintered body 3 for the purpose of, for example, improving wear resistance, heat resistance, and the like of the boron nitride sintered body 3. Note that, in the insert 1 illustrated in FIG. 2, the coating layer may be coated on the boron nitride sintered body 3 and the base body 5.

Figure 3:
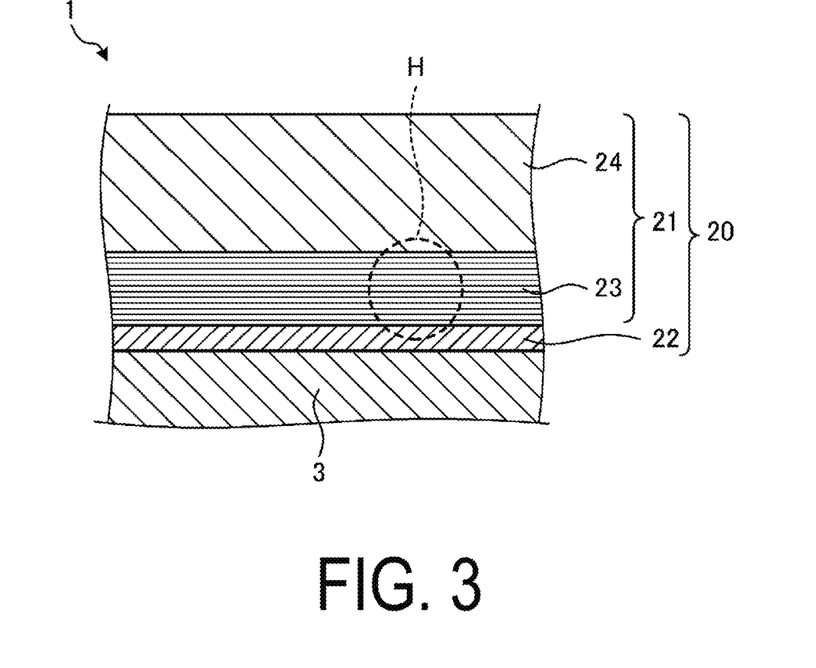
FIG. 3 is a cross-sectional view illustrating an example of a configuration of a coating layer of the present disclosure.

Here, an example of a configuration of the coating layer provided on the insert 1 will be described with reference to FIG. 3. FIG. 3 is a cross-sectional view illustrating an example of a configuration of the coating layer of the present disclosure.

As illustrated in FIG. 3, the insert 1 includes a coating layer 20. The thickness of the coating layer 20 may be, for example, 0.1 μm or greater and 5.0 μm or smaller.

The coating layer 20 includes a hard layer 21. The hard layer 21 is a layer having excellent wear resistance compared with a metal layer 22 described below. The hard layer 21 has one or more metal nitride layers. The hard layer 21 may be one layer. Additionally, as illustrated in FIG. 3, a plurality of metal nitride layers may be overlapped. Additionally, the hard layer 21 may include a laminate portion 23 in which a plurality of metal nitride layers are layered, and a third metal nitride layer 24 located above the laminate portion 23. The configuration of the hard layer 21 will be described later.

The coating layer 20 includes a metal layer 22. The metal layer 22 is located between the boron nitride sintered body 3 and the hard layer 21. Specifically, the metal layer 22 has a first surface (here, a lower surface) in contact with an upper surface of the boron nitride sintered body 3 and a second surface (here, an upper surface) located on an opposite side to the first surface and in contact with a lower surface of the hard layer 21.

The metal layer 22 has higher adhesion to the boron nitride sintered body 3 than to the hard layer 21. Examples of metal elements having such characteristics include Zr, V, Cr, W, Al, Si, and Y. The metal layer 22 contains at least one metal element among the above-described metal elements.

Note that a simple substance of Ti, a simple substance of Zr, a simple substance of V, a simple substance of Cr, and a simple substance of Al are not used as the metal layer 22. These are not suitable for use in cutting tools because all of these materials have a low melting point and low oxidation resistance. A simple substance of Hf, a simple substance of Nb, a simple substance of Ta, and a simple substance of Mo have low adhesion to the boron nitride sintered body 3. However, this does not apply to alloys containing Ti, Zr, V, Cr, Ta, Nb, Hf, and Al.

The metal layer 22 may be an Al—Cr alloy layer containing an Al—Cr alloy. Since the metal layer 22 has particularly high adhesion to the boron nitride sintered body 3, the effect of improving the adhesion between the boron nitride sintered body 3 and the coating layer 20 is high.

When the metal layer 22 is an Al—Cr alloy layer, the Al content in the metal layer 22 may be greater than the content of Cr in the metal layer 22. For example, the composition ratio (atomic %) of Al and Cr in the metal layer 22 may be 70:30. This composition ratio leads to higher adhesion between the boron nitride sintered body 3 and the metal layer 22.

The metal layer 22 may contain components other than the metal elements (Zr, V, Cr, W, Al, Si, Y). However, from a standpoint of adhesion to the boron nitride sintered body 3, the metal layer 22 may contain at least 95 atomic % or more of the metal elements in a combined amount. More preferably, the metal layer 22 may contain 98 atomic % or more of the metal elements in a combined amount. For example, in a case where the metal layer 22 is an Al—Cr alloy layer, the metal layer 22 may contain at least 95 atomic % or more of Al and Cr in a combined amount. Furthermore, the metal layer 22 may contain at least 98 atomic % or more of Al and Cr in a combined amount. Note that the proportion of the metal components in the metal layer 22 can be identified by, for example, analysis using an energy dispersive X-ray spectrometer (EDS).

Since Ti has poor wettability with the boron nitride sintered body 3, it is preferable that the metal layer 22 does not contain Ti as much as possible from the viewpoint of improving adhesion to the boron nitride sintered body 3. Specifically, the Ti content in the metal layer 22 may be 15 atomic % or less.

In this way, in the insert 1 of the present disclosure, the metal layer 22 having higher wettability with the boron nitride sintered body 3 than the hard layer 21 is provided between the boron nitride sintered body 3 and the hard layer 21, so that the adhesion between the boron nitride sintered body 3 and the coating layer 20 can be improved. Since the metal layer 22 has high adhesion to the hard layer 21, the hard layer 21 is less likely to peel off from the metal layer 22.

The boron nitride sintered body 3 is an insulator. The boron nitride sintered body 3 as an insulator has room for improvement in adhesion to a film formed by a physical vapor deposition (PVD) method. In contrast, in the insert 1 of the present disclosure, the metal layer 22 having electrical conductivity is provided on the surface of the boron nitride sintered body 3, and thus the adhesion between the hard layer 21 formed by the PVD method and the metal layer 22 is high.

Figure 4:
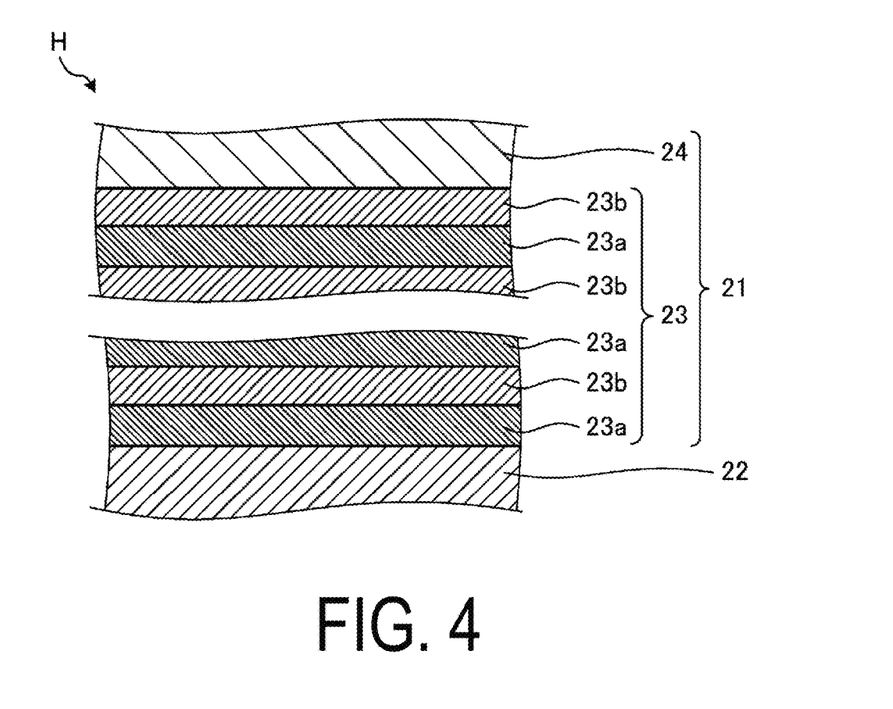
FIG. 4 is a schematic enlarged view of a portion H illustrated in FIG. 3.

The configuration of the hard layer 21 will be described with reference to FIG. 4. FIG. 4 is a schematic enlarged view of a portion H illustrated in FIG. 3.

As illustrated in FIG. 4, the hard layer 21 has a laminate portion 23 located on the metal layer 22 and a third metal nitride layer 24 located on the laminate portion 23.

The laminate portion 23 includes a plurality of first metal nitride layers 23a and a plurality of second metal nitride layers 23b. The laminate portion 23 has a configuration in which the first metal nitride layers 23a and the second metal nitride layers 23b are alternately layered.

The thickness of each of the first metal nitride layer 23a and the second metal nitride layer 23b may be 10 nm or greater and 50 nm or smaller. In this way, by forming the first metal nitride layer 23a and the second metal nitride layer 23b thin, the residual stress of the first metal nitride layer 23a and the second metal nitride layer 23b is small. As a result, for example, peeling and cracking of the first metal nitride layer 23a and the second metal nitride layer 23b are less likely to occur, and thus the durability of the coating layer 20 is high.

The first metal nitride layer 23a is a layer that contacts the metal layer 22, and the second metal nitride layer 23b is formed on the first metal nitride layer 23a.

The first metal nitride layer 23a and the second metal nitride layer 23b may contain a metal contained in the metal layer 22.

For example, it is assumed that two kinds of metals (here, "first metal" and "second metal") are included in the metal layer 22. In this case, the first metal nitride layer 23a contains a nitride of the first metal and the third metal. The third metal is a metal not included in the metal layer 22. The second metal nitride layer 23b contains a nitride of the first metal and the second metal.

For example, in the embodiment, the metal layer 22 may contain Al and Cr. In this case, the first metal nitride layer 23a may contain Al. Specifically, the first metal nitride layer 23a may be an AlTiN layer containing AlTiN, which is a nitride of Al and Ti. The second metal nitride layer 23b may be an AlCrN layer containing AlCrN, which is a nitride of Al and Cr.

In this way, the first metal nitride layer 23a containing the metal contained in the metal layer 22 is located on the metal layer 22, and thus the adhesion between the metal layer 22 and the hard layer 21 is high. This makes it difficult for the hard layer 21 to peel off from the metal layer 22, so the durability of the coating layer 20 is high.

The first metal nitride layer 23a, that is, the AlTiN layer is excellent in terms of, for example, wear resistance in addition to adhesion to the metal layer 22 described above. The second metal nitride layer 23b, that is, the AlCrN layer, has excellent heat resistance and oxidation resistance, for example. In this way, the coating layer 20 includes the first metal nitride layer 23a and the second metal nitride layer 23b having different compositions from each other, and therefore, can control characteristics such as wear resistance and heat resistance of the hard layer 21. Accordingly, the tool life of the insert 1 can be extended. For example, in the hard layer 21 according to the embodiment, mechanical properties such as adhesion with the metal layer 22 and wear resistance can be improved while maintaining excellent heat resistance of AlCrN.

In this way, at least a part of the coating layer 20 may have a plurality of layered layers (the first metal nitride layer 23a and the second metal nitride layer 23b) each having a thickness of 10 nm or greater and 50 nm or smaller.

Note that the laminate portion 23 may be formed by, for example, an arc ion plating method (AIP method). The AIP method is a method in which target metals (here, an AlTi target and an AlCr target) are evaporated by using an arc discharge in a vacuum atmosphere, and are combined with $N_2$ gas to form metal nitrides (here, AlTiN and AlCrN). Note that the metal layer 22 may also be formed by the AIP method.

The third metal nitride layer 24 may be located on the laminate portion 23. Specifically, the third metal nitride layer 24 is in contact with the second metal nitride layer 23b of the laminate portion 23. The third metal nitride layer 24 is, for example, a metal nitride layer (AlTiN layer) containing Ti and Al similar to the first metal nitride layer 23a.

The thickness of the third metal nitride layer 24 may be greater than each thickness of the first metal nitride layer 23a and the second metal nitride layer 23b. Specifically, as described above, when the thickness of the first metal nitride layer 23a and the second metal nitride layer 23b is 50 nm or less, the thickness of the third metal nitride layer 24 may be 1 μm or more. For example, the thickness of the third metal nitride layer 24 may be 1.2 μm.

As a result, for example, when the coefficient of friction of the third metal nitride layer 24 is low, the welding resistance of the insert 1 can be improved. For example, when the hardness of the third metal nitride layer 24 is high, the wear resistance of the insert 1 can be improved. For example, when the oxidation start temperature of the third metal nitride layer 24 is high, the oxidation resistance of the insert 1 can be improved.

The thickness of the third metal nitride layer 24 may be greater than the thickness of the laminate portion 23. Specifically, in the embodiment, when the thickness of the laminate portion 23 is 0.5 μm or less, the thickness of the third metal nitride layer 24 may be 1 μm or more. For example, when the thickness of the laminate portion 23 is 0.3 μm, the thickness of the third metal nitride layer 24 may be 1.2 μm. In this way, the third metal nitride layer 24 is thicker than the laminate portion 23, and thus the effect of improving the welding resistance, wear resistance, etc. described above is further enhanced.

The thickness of the metal layer 22 may be, for example, 0.1 μm or more and less than 0.6 μm. That is, the metal layer 22 may be thicker than each of the first metal nitride layer 23a and the second metal nitride layer 23b, and may be thinner than the laminate portion 23.

Cutting Tool

Figure 5:
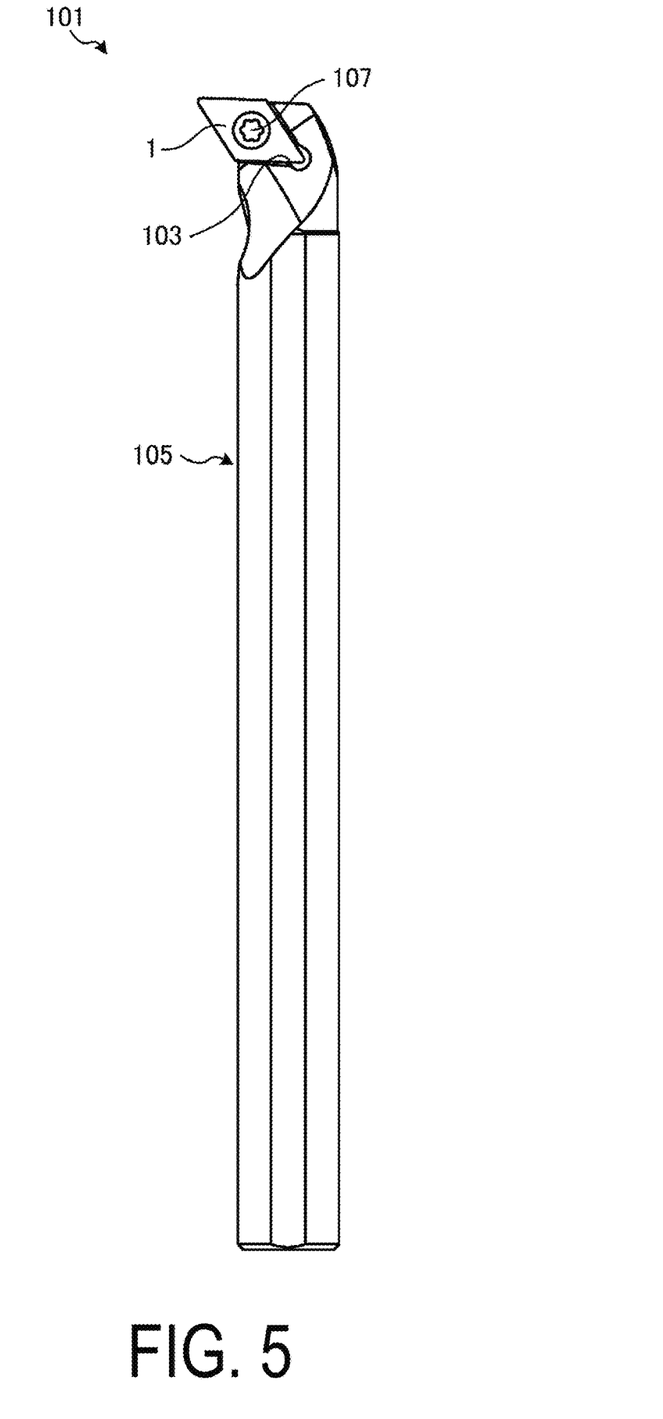
FIG. 5 is a view illustrating an example of a cutting tool of the present disclosure.

The cutting tool of the present disclosure will be described with reference to FIG. 5. FIG. 5 is a view illustrating an example of the cutting tool of the present disclosure.

As illustrated in FIG. 5, a cutting tool 101 of the present disclosure is, for example, a body having a bar-shape and extending from a first end (an upper end in FIG. 5) toward a second end (a lower end in FIG. 5).

As illustrated in FIG. 5, the cutting tool 101 includes a holder 105 having a length ranging from the first end (leading end) to the second end and including a pocket 103 located on the first end side, and the insert 1 located in the pocket 103. Since the cutting tool 101 includes the insert 1, stable machining can be performed for a long period of time.

The pocket 103 is a part in which the insert 1 is mounted, and has a seating face parallel to a lower surface of the holder 105, and a constraining lateral face perpendicular or inclined with respect to the seating face. The pocket 103 is open on the first end side of the holder 105.

The insert 1 is positioned in the pocket 103. At this time, the lower surface of the insert 1 may be in direct contact with the pocket 103, or a sheet (not illustrated) may be sandwiched between the insert 1 and the pocket 103.

The insert 1 is mounted on the holder 105 such that at least a part of a portion usable as the cutting edge 13 on a ridge part where the rake face 7 and the flank face 9 intersect protrudes outward from the holder 105. In the present embodiment, the insert 1 is mounted on the holder 105 using a fixing screw 107. That is, the insert 1 is mounted on the holder 105 by inserting the fixing screw 107 into a through hole (55) of the insert 1, inserting a leading end of the fixing screw 107 into a screw hole (not illustrated) defined in the pocket 103, and screwing threaded portions thereof together.

As a material of the holder 105, steel or cast iron can be used. Steel with high toughness may be used among these members.

In the present embodiment, a cutting tool used in so-called turning processing is exemplified. Examples of the turning processing may include inner diameter processing, outer diameter processing, and grooving processing. Note that, a cutting tool is not limited to those used in the turning processing. For example, the insert 1 according to the above-described embodiment may be used as a cutting tool used in milling processing.

Production Method

An example of a method for producing a boron nitride sintered body in the insert of the present disclosure will be described below. First, hexagonal boron nitride powder is prepared which is raw material powder and is flat in shape. One of commercially available raw materials whose average particle diameter is 0.7 μm or greater and whose oxygen impurity content is less than 0.5 mass % is used. The average particle diameter of the hexagonal boron nitride powder refers to an average value of lengths in a long axis direction of the boron nitride powder measured with an electron microscope. The hexagonal boron nitride powder may have an average particle diameter of 0.2 μm or greater and 30 μm or smaller. The hexagonal boron nitride powder may be of high purity with a purity of 99% or higher. The hexagonal boron nitride powder may contain a catalyst component that is used when producing cubic boron nitride powder. Alternatively, a raw material powder having a purity of less than 99% may be used.

A cubic orientation value and a compressed boron nitride orientation value after sintering can be controlled by molding the raw material powder by uniaxial pressing, and by controlling the pressure during the molding. The flat hexagonal boron nitride powder is oriented during the molding by uniaxial pressing such that the 002 plane of the hexagonal boron nitride powder is oriented perpendicular to the pressing axis direction of the pressing. When the uniaxial pressing is performed such that the same powder compact is subjected to repetitive pressure, the orientation of the hexagonal boron nitride powder in the powder compact is high.

Subsequently, the boron nitride sintered body of the present disclosure can be obtained by firing the powder compact manufactured by the above method at a temperature of 1800 to 2200 degrees and a pressure of 8 to 10 GPa. The proportion of the compressed boron nitride included in the boron nitride sintered body can be controlled by the temperature and pressure during the firing. Further, a coating layer can be formed on the boron nitride sintered body by the above-described production method.

While the boron nitride sintered body, the insert and the cutting tool of the present disclosure have been described, the present disclosure is not limited to the above embodiment, and various improvements and changes may be made without departing from the gist of the present disclosure.

Example

Powder compacts were obtained by uniaxial pressing of hexagonal boron nitride powders being flat in shape and having average particle diameters of 0.3 µm, 6 µm and 16 µm, and an oxygen impurity content of 0.3 mass %. The same hexagonal boron nitride powders were uniformly pressed to produce powder compacts. These powder compacts were fired under conditions shown in Table 1.

Subsequently, the obtained sintered bodies were cut out in a direction perpendicular to the first surface of the sintered bodies, thereby manufacturing test pieces each of which included a surface intersecting with the first surface at a right angle and had a thickness of about 0.5 mm. Using the curved IP X-ray diffractometer "RINT RAPID2" available from Rigaku Corporation, the compressed boron nitride content value, the cubic orientation value and the compressed boron nitride orientation value were obtained on the basis of a cross section perpendicular to the first surface of the test pieces. The obtained values are shown in Table 1. A part of each of the obtained sintered bodies was cut out to manufacture an insert. A sample in which a coating layer was provided on a surface of the insert was also manufactured. The configuration of the coating layer is shown in Table 2. Note that, in the following test, an insert having no coating layer and an insert having two types of coating layers were evaluated.

TABLE 1

| Sample No. | Particle diameter (µm) of hexagonal boron nitride powder | Pressure molding method | Firing temperature (° C.) | Pressure (GPa) | Compressed boron nitride content value | Cubic orientation value | Compressed boron nitride orientation value |
| --- | --- | --- | --- | --- | --- | --- | --- |
| 1 | 0.3 | Uniform pressure | 2100 | 9 | 0.0038 | 0.49 | 0.50 |
| 2 | 6 | Uniform pressure | 2100 | 9 | 0.0040 | 0.51 | 0.49 |
| 3 | 16 | Uniform pressure | 2100 | 9 | 0.0043 | 0.52 | 0.51 |
| 4 | 0.3 | Uniaxial | 2100 | 9 | 0.0037 | 0.54 | 0.56 |
| 5 | 6 | Uniaxial | 2100 | 9 | 0.0041 | 0.56 | 0.61 |
| 6 | 16 | Uniaxial | 2100 | 9 | 0.0043 | 0.58 | 0.68 |
| 7 | 6 | Uniform pressure | 2100 | 11 | 0.0000 | 0.50 | — |
| 8 | 0.3 | Uniaxial | 2100 | 11 | 0.0000 | 0.55 | — |
| 9 | 6 | Uniaxial | 2100 | 11 | 0.0000 | 0.56 | — |
| 10 | 16 | Uniaxial | 2100 | 11 | 0.0000 | 0.59 | — |
| 11 | 6 | Uniform pressure | 1700 | 11 | 0.0040 | 0.51 | 0.46 |
| 12 | 0.3 | Uniaxial | 1700 | 11 | 0.0036 | 0.60 | 0.64 |
| 13 | 6 | Uniaxial | 1700 | 11 | 0.0035 | 0.64 | 0.80 |
| 14 | 16 | Uniaxial | 1700 | 11 | 0.0038 | 0.70 | 1.00 |
| 15 | 16 | Uniform pressure | 2300 | 7.7 | 0.0040 | 0.51 | 0.49 |
| 16 | 16 | Uniaxial | 2300 | 7.7 | 0.0040 | 0.54 | 0.51 |

TABLE 2

| | | Coating layer | | | | | | | |
| --- | --- | --- | --- | --- | --- | --- | --- | --- | --- |
| | | | | Hard layer | | | | | |
| | | Metal layer | | First metal nitride layer | | Second metal nitride layer | | First metal nitride layer + Second metal nitride layer | Third metal nitride layer | |
| Sample | Base body | Type | Thickness (µm) | Type | Thickness (nm) | Type | Thickness (nm) | Thickness (µm) | Type | Thickness (µm) |
| cBN without metal layer | cBN | — | — | TiAlNbWSiN | 50 | AlCrN | 50 | 0.5 | TiAlNbWSiN | 2 |
| cBN with metal layer | cBN | $Al_{70}Cr_{30}$ | 0.2 | | | | | | | |

A cutting test was conducted using the first surface of the insert as a rake face. Conditions of the cutting test are set forth below.

Cutting Test Conditions

Workpiece material: Ti alloy (Ti-6Al-4V)
Cutting conditions: Vc=100 m/min, f=0.1 mm/rev, ap=0.4 mm, Wet
Tool used: CNGA120408

Sample Nos. 1-3, 7, 11 and 15, which are the samples obtained from the powder compacts molded under uniform pressure, do not include the configuration of the boron nitride sintered body in the insert of the present disclosure. Even when a powder compact obtained by uniaxial pressing was used, Sample Nos. 8-10, obtained with a firing temperature of 2100° C. and a firing pressure of 11 GPa, did not contain compressed boron nitride. Sample No. 16, which was formed using a powder compact obtained by uniaxial pressing, a firing temperature of 2300° C., and a firing pressure of 7.7 GPa, contained compressed boron nitride, but the compressed boron nitride orientation value was smaller than the cubic orientation value.

On the other hand, Sample Nos. 4 to 6 and 12 to 14 of samples molded by uniaxial pressing had compressed boron nitride content values smaller than 0.005, cubic orientation values larger than 0.5, and compressed boron nitride orientation values larger than the cubic orientation values, and thus a long life. Note that the average particle diameters of the cubic boron nitrides of Samples Nos. 4 to 6 and 12 to 14 were all 200 nm or smaller. In particular, the average particle diameter of each of Sample No. 4 and Sample No. 12, for which a raw material powder having a small average particle diameter was used, was 100 nm or smaller.

Sample Nos. 5, 6, 12, 13 and 14, each having a cubic orientation value of 0.55 or larger, had a longer life than Sample No. 4 having a cubic orientation value of smaller than 0.55. Sample Nos. 13 and 14, each having a compressed boron nitride orientation value of 0.8 or larger, had a longer life than Sample No. 12 having a compressed boron nitride orientation value of smaller than 0.8.

Samples not satisfying the configuration requirements of the boron nitride sintered body in the insert of the present disclosure had a shorter life than Sample Nos. 4 to 6 and 12 to 14, each being the insert of the present disclosure. In all the samples, the insert with the coating layer had a longer life than the insert without the coating layer. In particular, the insert having the metal layer had a long life.

Note that the embodiments disclosed herein are exemplary in all respects and not restrictive. The aforementioned embodiments can be embodied in a variety of forms. The above-described embodiments may be omitted, substituted or modified in various forms without departing from the scope and spirit of the appended claims.

REFERENCE SIGNS

1 Insert
3 Boron nitride sintered body
5 Base body
7 Rake face
9 Flank face
13 Cutting edge
20 Coating layer
21 Hard layer
22 Metal layer
23 Laminate portion
23a First metal nitride layer
23b Second metal nitride layer
24 Third metal nitride layer
101 Cutting tool
103 Pocket
105 Holder

The invention claimed is:

1. An insert comprising:
a boron nitride sintered body having a first surface, a second surface, and a cutting edge located on at least a part of a ridge part of the first surface and the second surface, wherein
the boron nitride sintered body contains cubic boron nitride and compressed boron nitride, wherein
in a transmission X-ray diffraction of a cross section of the boron nitride sintered body perpendicular to the first surface,
in a direction perpendicular to the first surface
when an X-ray intensity at a top of a 111 diffraction peak of the cubic boron nitride is denoted as IcBN(111)v, and an X-ray intensity at a top of a 002 diffraction peak of the compressed boron nitride is denoted as IhBN(002)v, and
in a direction parallel to the first surface
when an X-ray intensity at a top of a 111 diffraction peak of the cubic boron nitride is denoted as IcBN(111)h, and an X-ray intensity at a top of a 002 diffraction peak of the compressed boron nitride is denoted as IhBN(002)h,
a compressed boron nitride content value indicated by (IhBN(002)v+IhBN(002)h)/(IcBN(111)v+IcBN(111)h) is larger than 0.002 and smaller than 0.01,
a cubic orientation value indicated by IcBN(111)v/(IcBN(111)v+IcBN(111)h) is larger than 0.5, and
a compressed boron nitride orientation value indicated by IhBN(002)v/(IhBN(002)v+IhBN(002)h) is larger than the cubic orientation value; and wherein
a coating layer is provided on at least a part of a surface of the boron nitride sintered body.

2. The insert according to claim 1, wherein the cubic orientation value is 0.55 or greater.

3. The insert according to claim 1, wherein the compressed boron nitride orientation value is 0.8 or greater.

4. The insert according to claim 1, wherein the boron nitride sintered body contains Wurtzite boron nitride.

5. The insert according to claim 1, wherein an average particle diameter of the cubic boron nitride in the cross section is 200 nm or smaller.

6. The insert according to claim 1, wherein a thickness of the coating layer is 0.1 μm or greater and 5.0 μm or smaller.

7. The insert according to claim 1, wherein the coating layer comprises a plurality of layered layers, and the coating layer in contact with the boron nitride sintered body is formed of a metal.

8. The insert according to claim 7, wherein the metal is a metal other than a simple substance of Ti, Zr, V, Cr, Ta, Nb, Hf, or Al.

9. The insert according to claim 8, wherein the metal contains at least one or more elements selected from the group consisting of Zr, Hf, V, Nb, Ta, Cr, Mo, W, Al, Si, and Y.

10. The insert according to claim 1, wherein at least a part of the coating layer comprises a plurality of layered layers, each having a thickness of 10 nm or greater and 50 nm or smaller.

11. A cutting tool comprising:
a holder having a length ranging from a first end to a second end and comprising a pocket on the first end side; and
the insert according to claim 1 located in the pocket.

* * * * *